United States Patent [19]
Fujii et al.
[11] Patent Number: 4,882,556
[45] Date of Patent: Nov. 21, 1989

[54] MULTI-POLE CIRCUIT INTERRUPTER

[75] Inventors: Hiroshi Fujii; Tsukasa Iio; Yasusi Genba; Hideaki Moriwaki; Yoshinori Mochizuki, all of Midori, Japan

[73] Assignee: Mitsubishi Denki Kabushiki Kaisha, Japan

[21] Appl. No.: 267,617

[22] Filed: Nov. 1, 1988

Related U.S. Application Data

[63] Continuation of Ser. No. 92,945, Sep. 4, 1987, abandoned.

[30] Foreign Application Priority Data

Sep. 9, 1986 [JP] Japan .......................... 61-138780[U]

[51] Int. Cl.⁴ ........................ H01H 71/00; H02B 1/08
[52] U.S. Cl. .......................................... 335/8; 337/7; 337/45
[58] Field of Search ................ 200/16 C, 16 D, 50 C, 200/284; 335/8, 9, 10; 361/346, 347, 348, 350, 351, 353, 355, 363, 376; 337/7, 45

[56] References Cited

U.S. PATENT DOCUMENTS 2,845,507 7/1958 Brumfield .............................. 335/8
2,989,605 6/1961 Leonard ............................ 335/8 X
3,422,381 1/1969 Toth ....................................... 335/9

FOREIGN PATENT DOCUMENTS 54-65376 5/1979 Japan .

*Primary Examiner*—J. R. Scott
*Attorney, Agent, or Firm*—Leydig, Voit & Mayer

[57] ABSTRACT

A multi-pole circuit interrupter comprising an electrically insulating housing having two side walls and at least two partition walls defining therebetween a central compartment and at least two side compartments. A central pole unit is disposed within the central compartment and a side pole unit is disposed within each of two side compartments. Each of the units includes a stationary contact element, a movable contact arm, an arc extinguisher and terminals for the external connection. The distance between a center line passing through the centers of the stationary contact element, the movable contact arm and the arc extinguisher of each of the pole units is smaller than the distance between the center lines passing through the terminals of each pole unit, so that the thickness of the housing side wall can be increased without increasing the overall width dimension of the housing.

1 Claim, 4 Drawing Sheets

FIG. I
PRIOR ART

MULTI-POLE CIRCUIT INTERRUPTER

This application is a continuation of application Ser. No. 07/092,945, filed Sept. 4, 1987, now abandoned.

BACKGROUND OF THE INVENTION

This invention relates to a multi-pole circuit interrupter and, more particularly, to a multi-pole circuit interrupter having a central pole unit and side pole units disposed on the both sides of the central pole unit.

FIGS. 1 to 3 illustrate one example of a conventional multi-pole circuit interrupter. FIG. 1 is a front view of the conventional multi-pole circuit interrupter with the cover partly cut away, FIG. 2 is a sectional side view taken along line II—II of FIG. 1, and FIG. 3 is a sectional view taken along line III—III of FIG. 2.

In these figures, the multi-pole circuit interrupter comprises an electrically insulating housing 1 composed of a cover 1A and a base 1B. The housing 1 includes two outer walls *1a* and two partition walls *1b* defining three compartments therebetween in which a central pole unit A and side pole units B are disposed. On the housing base 1B, a stationary contact 2, which has a stationary contact element 2a on its one end and which has a terminal 17B including a terminal screw hole *2b* at the other end, is fixedly mounted. An arc runner 3 and an electrically insulating casing 4 are mounted to the stationary contact 2, and a frame 5 is also mounted to the base 1B by screws 6 (only one is shown). The frame 5 supports at its projection *5a* an operating handle 7 so that the operating handle 7 is rotatable about the projection *5a*. The operating handle 7 has mounted thereon a cradle 8 pivotable relative to the operating handle 7.

A toggle link 10, which includes an upper toggle link *10a* and a lower toggle link *10b* pivotally connected to the upper toggle link 10a by a knee pin 11, is connected to the operating handle 7 by an upper toggle link pin 9 at the upper end of the upper toggle link *10a*. The lower end of the lower toggle link *10b* is connected by a pin 14 to a cross bar 13 which is rotatably mounted with respect to the base 1B. The knee pin 11 of the toggle link 10 is biased toward the operating handle 7 by a tension spring 12 connected between the pin 11 and the handle 7, thus maintaining the upper toggle link 10a in engagement with the pin 9. A movable contact arm 15 having a movable contact element 15a secured thereon is rotatably mounted on the cross bar 13 by a shaft 16. The movable contact arm 15 is electrically connected through a flexible conductor 18 to a terminal conductor 17 which is secured to the base 1B and has a terminal 17A with a screw hole *17a*.

The circuit interrupter also comprises an electromagnetic trip device including an electromagnetic device 19 which has a movable plunger *19a*. A thermally responsive trip device having a bimetal 20 with an adjusting screw *20a* is also provided. In order to pick up the movements of two kinds of trip devices, a trip bar 21 which is rotated by the screw *20a* or the plunger *19a* is provided. The trip bar 21 is in engagement with a latch 22 which is in engagement with a latch 23 to releasably latch the cradle 8. An arc extinguisher 24 including a plurality of arc extinguishing plates *24a* is also disposed within the housing.

As is well known in the art, the operating handle 7 as above described is provided only in the central pole unit disposed within the central compartment. However, since all the movable contact arms 15 of the pole units A and B are connected to each other by the cross bar 13, they move in unison when the central pole unit A is manually moved or when at least one of the three pole units A and B is tripped.

When the circuit interrupter is in the ON position shown in FIGS. 1 to 3, the current flows from the stationary contact 2 to the terminal conductor 17 through a stationary contact element *2a*, the movable contact element *15a*, the movable contact arm 15 and the flexible conductor 18. When the operating handle 7 is moved in the direction of an arrow 25, the upper end of the tension spring 12 is moved beyond the dead center of the line of action of the spring 12, causing the tension spring 12 to collapse the toggle link 10 to move the movable contact arm 15 upwards together with the cross bar 13 until the movable contact assembly takes the OFF position.

When a very large current flows through the circuit interrupter in the ON position shown in FIG. 1, the electromagnetic trip device is actuated to push out the plunger *19a* from the electromagnetic device 19. Alternatively, when an overcurrent flows through the circuit interrupter in the ON position shown in FIG. 1, the thermally responsive trip device is actuated to push the trip bar 21 by the adjusting screw *20a*. In either case, the trip bar 21 is rotated to rotate the latch member 22 and then the latch 23 rotates to release the cradle 8 under the action of the spring 12 which biases the cradle 8 to rotate clockwise. The cradle 8 is then rotated clockwise in FIG. 3 so that the toggle link pin 9 moves overcenter causing the toggle link 10 to collapse to rotate the movable contact arm 15 together with the cross bar 13 about the shaft 16 until they are brought into the TRIP position in which the movable contact element *15a* is separated from the stationary contact element *2a*.

With the multi-pole circuit interrupter as above described, the stationary contacts 2 in the three pole units A and B have the same configuration as shown in FIGS. 1 and 3. Therefore, the distance y between a center line x passing through the centers of the stationary contact element *2a*, the movable contact arm 15 and the arc extinguisher 24 of the respective pole units A and B equals the distance z between center lines of the terminals 17A and 17B or center lines passing through the terminal screw holes *2b* and *17a*. Therefore, as best seen in FIG. 1, the side walls *1a* are significantly thinner at the portion adjacent to the main mechanism including the stationary contact elements *2a*, the movable contact arm 15 and the arc extinguisher 24 than the portion adjacent to the terminals 17A and 17B and than the partition walls 1b disposed between the pole units A and B. If it is desired to increase the strength of the side walls *1a* of the housing 1, the thickness of the side walls must be increased so that the overall width dimension of the housing 1 must also be increased.

SUMMARY OF THE INVENTION

Accordingly, an object of the present invention is to provide a multi-pole circuit interrupter in which a housing side wall thickness can be increased without the need for increasing the overall width dimension of the housing.

With the above object in view, the multi-pole circuit interrupter of the present invention comprises, an electrically insulating housing having two side walls and at least two partition walls defining therebetween a central compartment and at least two side compartments. A central pole unit is disposed within the central compartment and side pole units are disposed within the side compartments, and each pole unit has a stationary contact element, a movable contact arm, an arc extinguisher and terminals for the external connection. The distance between a center line passing through the centers of the stationary contact element, the movable contact arm and the arc extinguisher of each of the central pole units and the side pole units is smaller than the distance between the center lines passing through the terminals.

BRIEF DESCRIPTION OF THE DRAWINGS

The present invention will become more readily apparent from the following detailed description of the preferred embodiment taken in conjunction with the accompanying drawings, in which.

The same reference numerals designate identical or corresponding components throughout the figures.

DESCRIPTION OF THE PREFERRED EMBODIMENT

Figure 5:
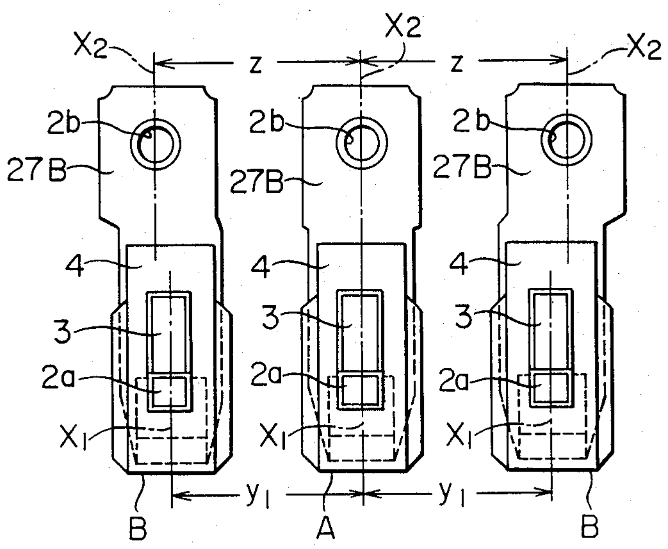
FIG. 5 is a view showning the main portion of FIG. 4.
Figure 4:
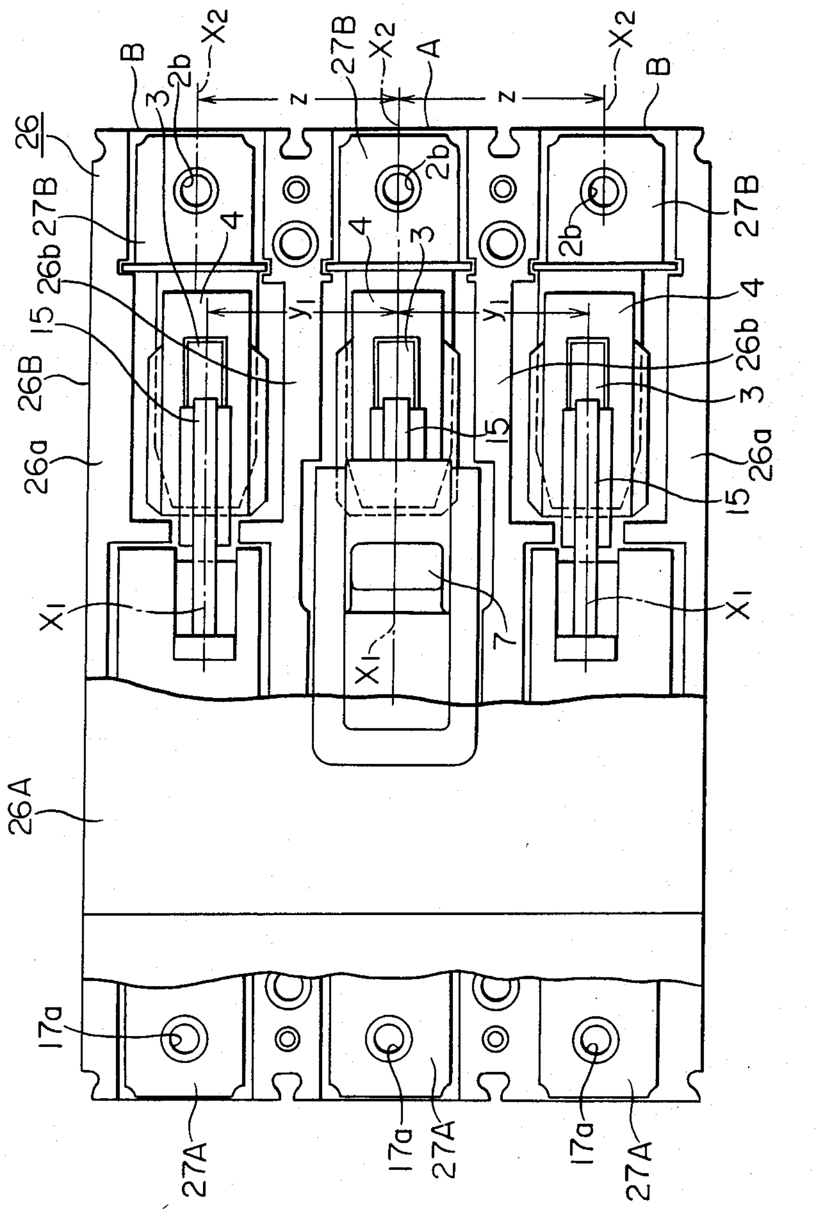
FIG. 4 is a front view of the circuit interrupter of the present invention with the cover partly removed.

FIGS. 4 and 5 show the multi-pole circuit interrupter of the present invention. FIG. 4 is a front view of the circuit interrupter of the present invention with the cover partly removed and FIG. 5 is a view showing the main portion of FIG. 4.

The multi-pole circuit interrupter of the present invention has a construction identical to the conventional design except for the construction of the side pole units. As shown in FIGS. 4 and 5, the multi-pole circuit interrupter comprises an electrically insulating housing 26 including a cover 26A and a base 26B. The housing 26 having two side walls 26*a* and two partition walls 26*b* together defining therebetween a central compartment 28 and two side compartments 29. A central pole unit A is disposed within the central compartment 28 and has the stationary contact element 2*a*, the movable contact arm 15, the arc extinguisher (not shown) and terminals 27A and 27B for the external connection. A side pole unit B is disposed within each of the side compartments B and each has the stationary contact element 2*a*, the movable contact arm 15, the arc extinguisher (not shown) and the terminals 27A and 27B for the external connection. According to the present invention, a distance y, between a center line X, passing through centers of the stationary contact element 2a, the movable contact arm 15 and the arc extinguisher (not shown in FIGS. 4 and 5) of each of the central pole unit A and the side pole units B is smaller than a distance z between the center lines $X_2$ of the terminals 27A and 27B.

Figure 1:
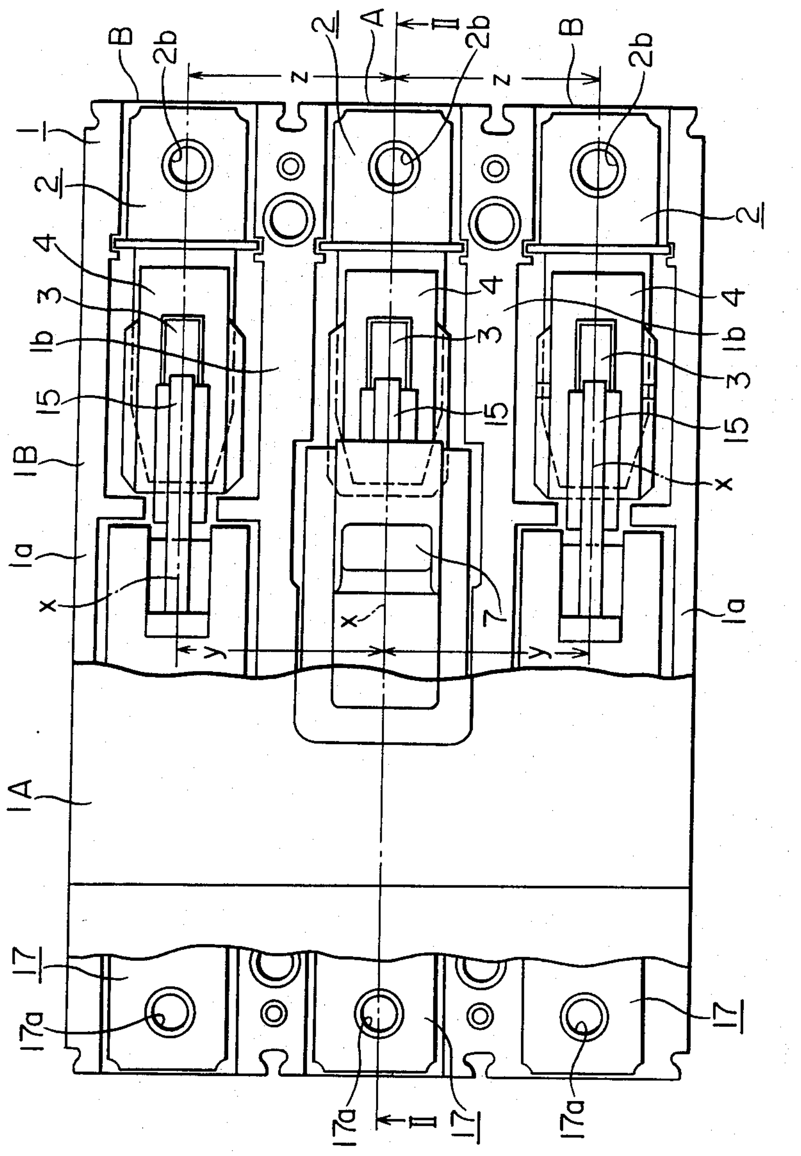
FIG. 1 is a front view of the conventional multipole circuit interrupter with the cover partly cut away.
Figure 2:
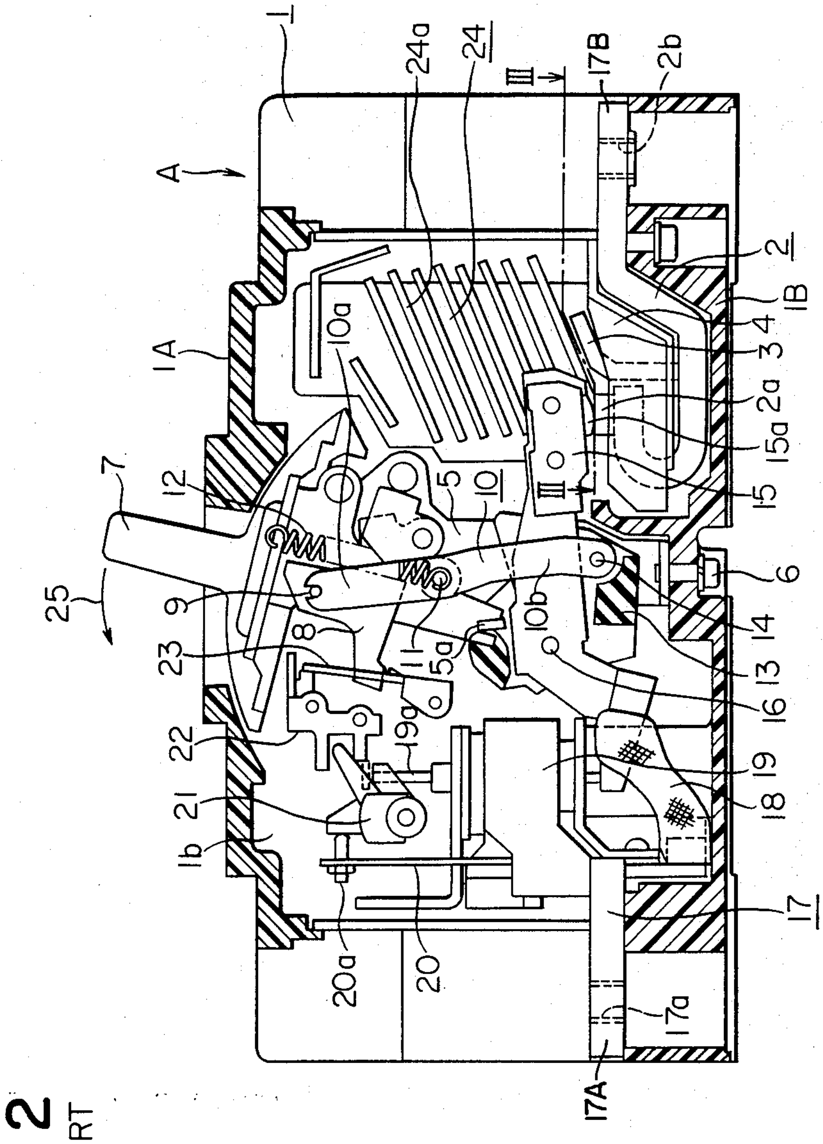
FIG. 2 PRIOR ART
FIG. 2 is a sectional side view taken along line II—II of FIG. 1.
Figure 3:
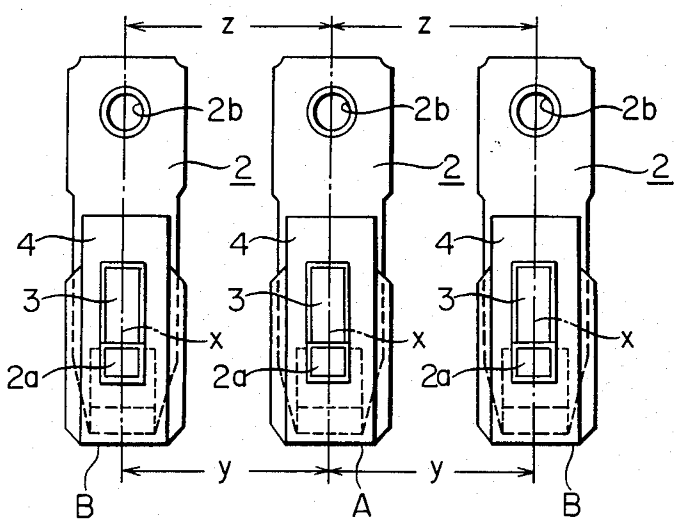
FIG. 3 PRIOR ART
FIG. 3 is a sectional view taken along line III—III of FIG. 2.

Therefore, while the terminals 27A and 27B are disposed with the same distance between them and the terminals 27A and 27B for the respective pole units A and B are separated in the width direction by the same distance as that of the conventional design, the stationary contact elements 2*a*, the movable contact arm 15 and the arc extinguisher for the respective pole units A dna B are separated in the width direction by a distance smaller than that of the conventional design by an amount corresponding to the difference between the center line distances y and $y_1$. This difference provides an additional space on the outer side of each of the side pole units B. This additional space can be utilized as a space for an additional thickness of the side walls 26*a* of the housing 26, which provides an increase in mechanical strength of the side walls 26*a* without increasing the overall width dimension of the housing 26. Therefore, the current interrupting capability of the circuit interrupter can be increased by an amount corresponding to the increased strength of the side walls 26*a* of the housing 26. While the partition walls 26*b* between the compartments are thinner than those of the conventional design illustrated in FIGS. 1 to 3, they are still as thick as the side walls 26*a*, so that they have sufficient mechanical strength. When the wall thicknesses of the side walls 26*a* and the partition walls 26*b* of the cover 26A and the base 26B of the housing 26 are equalized, the moldability of the cover 26A and the 26B is improved.

What is claimed is:

1. A multi-pole circuit interrupter comprising:

an electrically insulating housing having two side walls and at least two partition walls defining therebetween a central compartment and at least two side compartments, said side walls and partition walls all being substantially parallel and transverse to the width of said housing;

a central pole unit disposed within said central compartment and having a stationary contact element, a movable contact arm, an arc extinguisher, and a pair of terminals having a common center line with the central pole unit for external connections; and a side pole unit disposed within each of said side compartments, each side pole unit having a stationary contact element, a movable contact arm, an arc extinguisher, and a pair of terminals having a common side pole terminal center line for external connections, wherein the stationary contact element, the movable contact arm, and the arc extinguisher of each of the side pole units are offset with respect to the center lines of the terminals thereof in a direction toward the central pole unit and the distances from the center line of the central pole unit, the center line of the central pole unit passing through the centers of the stationary contact element, the movable contact arm, and the arc extinguisher of the central pole unit, to center lines passing through the centers of the stationary contact elements, the movable contact arms and the arc extinguishers of the side pole units are smaller than the distances from the center line of the central pole unit and the side pole terminal center lines, all of the center lines being generally parallel to each other and to said partition walls, whereby the spacing between the center pole unit and the respective side pole units may be increased without increasing the width of the housing.

* * * * *